UNITED STATES PATENT OFFICE.

WILLIAM D. RICHARDSON, OF CHICAGO, ILLINOIS, ASSIGNOR TO SWIFT & COMPANY, OF CHICAGO, ILLINOIS, A CORPORATION OF ILLINOIS.

CATALYZER AND METHOD OF PRODUCING THE SAME.

1,419,986.   Specification of Letters Patent.   Patented June 20, 1922.

No Drawing.   Application filed March 9, 1920. Serial No. 364,391.

*To all whom it may concern:*

Be it known that I, WILLIAM D. RICHARDSON, a citizen of the United States, residing at the city of Chicago, in the county of Cook, State of Illinois, have invented certain new and useful Improvements in Catalyzers and Methods of Producing the Same; and I do hereby declare the following to be a full, clear, and exact description of the invention, such as will enable others skilled in the art to which it appertains to make and use the same.

This invention relates to improvements in the production of catalyzers in a finely pulverulent state, by mechanical means.

The invention is based upon the discovery that nickel, in bulk form, which possesses practically no catalytic activity, can be converted into a finely pulverulent nickel catalyzer of high catalytic activity by subjecting it to a suitable mechanical grinding or abrading, or attrition in the presence of water, with the resulting production of a more or less thick mud containing the finely pulverulent catalyzer particles therein.

I have found that the production of a catalyzer by carrying out the grinding or abrasion or attrition operation in the presence of water, results in the production of a catalyzer which, in many cases, has been found to have a definitely greater activity than when finely pulverulent catalyzers are similarly produced in the presence of oil.

The process of the present invention is further distinguished from processes in which the catalyzer is produced in the presence of oil by the subsequent treatment to which the catalyzer is subjected in order to make it available for use in the catalytic hydrogenation of oils and similar unsaturated organic liquids. When the catalyzer produced by the process of the present invention is to be used for such purposes, it is usually necessary to remove the water prior to hydrogenation of the oil therewith.

The present invention, accordingly, relates to a process which, in many instances, is a composite process involving the production of the finely pulverulent catalyzer by mechanical means in the presence of water, and the subsequent treatment of the aqueous mud thus produced, as by drying to remove the water, and by subsequent grinding in the absence of water, and either with or without the presence during the subsequent grinding of the oil or other liquid to be hydrogenated.

The production of the finely pulverulent catalyzer, according to the present invention, is preferably carried out by subjecting bulk nickel, which is inactive catalytically, or which possesses practically no catalytic activity, for example, in the form of lumps or grains or shot, etc., to such a grinding or abrasion treatment that the catalyzer produced will be in a state of such exceeding fineness that most, if not all, of the minute catalyzer particles are of a fineness adapting them to be maintained in suspension in the water, or in the fatty oil or other liquid to be hydrogenated.

It is not absolutely necessary, however, that the nickel should all be brought into this finely pulverulent form as the development of the catalytic activity seems to be in part at least a function of the grinding or abrading or similar mechanical treatment incident to the operation and to be promoted by the carrying out of the operation in the presence of water; but I consider that the invention is practiced to greater advantage when the catalyzer is made up largely, if not completely, of minute particles of such an exceeding fineness that they are readily adapted to be maintained in suspension in liquids for considerable periods of time. The particles may be considered to approach colloidal particles in their fineness of subdivision in the product of the present process when this process is carried out in its most advantageous manner.

The mechanical grinding or abrading or attrition operation, or the like treatment to which the bulk nickel is mechanically subjected, in the presence of water, in practicing the process of the present invention, may be carried out in various types of apparatus available for such grinding or abrading or similar operations and for the production of the finely pulverulent product with the high degree of catalytic activity developed therein.

In the practice of the present invention, I have found it convenient and advantageous to make use of a ball mill or pebble mill for bringing about the grinding or abrasion of the bulk nickel and the conversion thereof into a finely pulverulent catalyzer. I have used to advantage a ball mill provided with a porcelain lining, the porcelain lining protecting the catalyzer produced from contamination with foreign ingredients which might be prejudicial to the desired catalytic activity. If other materials than porcelain are used in the construction or lining of the apparatus, these materials should in general be of such a character and composition that they will not be objectionable in the finely pulverulent catalyzer if they are themselves abraded to a certain extent and incorporated with the catalyzer produced.

In carrying out the process in such a ball or pebble mill, the bulk nickel, for example, nickel shot, or other suitable or convenient form of nickel, such as turnings, clippings and the like, may be introduced into the ball mill together with a suitable quantity of water. Preferably also, a finely divided abrasive is also added. When the ball mill or pebble mill is set in operation, the nickel will be subjected to a grinding or abrading operation, and this operation will be benefited and promoted by the water present with the resulting production of the finely pulverulent catalyzer of the desired catalytic activity.

When no abrasive is used, the nickel shot or other nickel particles will grind or abrade each other, and the finely pulverulent particles thus produced will promote this grinding or abrading operation. Without an added abrasive, however, the operation is slow, and is not generally to be recommended, particularly since the addition of the finely pulverulent abrasive enables the operation to be very materially promoted with the production of a correspondingly increased amount of the finely pulverulent catalyzer, and without any materially increased power consumption for the operation of the ball mill.

When a finely divided abrasive is used, such abrasive may be, for example, silica, quartz, sand, alundum, emery, carborundum, etc., or other abrasive, whether in finely pulverulent or lump form, which is without prejudicial effect upon the development of the desired catalytic activity and the subsequent catalytic operation in which the catalyzer is to be used. In general, a finely divided abrasive of about 200 mesh is well adapted for use in the process of the present invention.

The grinding or abrading operation in the ball mill or pebble mill, may be continued for a considerable period of time, and until a sufficient amount of the finely pulverulent catalyzer has been produced. The fine nickel particles first produced will be subjected to further grinding or abrasion during the continuation of the process, so that the particles will tend to become progressively finer and more minute and the catalytic activity of the product will be correspondingly benefited. The minute particles will be picked up and enveloped by the water and protected from objectionable oxidation by the surrounding atmosphere, in case this is of an oxidizing character. The water moreover will circulate freely during the operation of the ball mill and until its content of finely pulverulent catalyzer and abrasive makes it more sluggish in its action. The increase in the production of the catalyzer will result in the thickening of the aqueous mud. Accordingly, at the end of the grinding or abrading operation, there will have been produced a more or less thick mud made up of the finely pulverulent nickel catalyzer and water together with the finely divided abrasive when used. The thickness of this mud will vary with the proportions of water and abrasive used and with the prolongation of the grinding operation and the amount of finely pulverulent nickel catalyzer produced. The catalyzer mud, if not too thick, can be readily handled as a liquid, by pumping or flowing through pipes or other conduits. If allowed to stand, the minute particles will gradually settle and form a thicker mud which may assume the form of a more or less solid cake. The catalyzer in this form is well adapted for handling and shipment, and can, moreover, be readily treated for the removal of the water therefrom.

In order to use the catalyzer for hydrogenation purposes, it will usually be necessary to remove the water as by drying, and to incorporate the catalyzer with the oil to be hydrogenated.

The drying of the catalyzer, for the removal of water, and the incorporation of the catalyzer with the oil or other liquid to be hydrogenated, may be effected in various ways. The mud may, for example, either before or after settling to effect a partial separation of water, be placed in pans and dried at a moderate temperature, as by heating on steam coils.

I have found that a nickel catalyzer produced in the manner described may be dried in the air and subsequently reground in the air without usually requiring protection from oxidation thereby. If, however, the catalyzer is dried or reground at such a temperture or under such conditions that it tends to become oxidized, or to lose its catalytic activity, it may be protected by a protective gas or medium, such as hydrogen or other non-oxidizing gas.

The catalyzer, after drying, may be added directly to the oil to be hydrogenated, and it will generally disintegrate and be distributed throughout the oil by the circulation or agitation of the oil during the hydrogenation operation. However, owing to the tendency of the catalyzer to cake or to form lumps when dried, it is more advantageous, in order to secure more prompt action and best results, to regrind the catalyzer either before adding it to the oil, or in the presence of the oil.

The regrinding of the catalyzer may be effected in a satisfactory and advantageous manner in the same sort of ball mill or pebble mill used in the first instance for the production of the catalyzer; and such a regrinding operation will have a tendency to increase still further the catalytic activity of the product. Such a regrinding operation may be carried out either without oil or other liquid, and in a gaseous atmosphere, or with the addition of oil, so that the catalyzer will be reground and at the same time intimately mixed and combined with the oil.

An ordinary paint mill may similarly be used, consisting of a horizontal rotating steel disc working against the lower edge of a holding pan which serves as a container for the material to be ground. In general, any of the ordinary types of paint mills, used for grinding paint pigments in oil, may be used in the regrinding of the catalyzer of the present invention in order to bring about its uniform distribution in the oil to be hydrogenized; but such operations should be carried out without contamination of the catalyzer with substances prejudicial to its catalytic activity.

Instead of using a grinding apparatus, any cakes formed during the grinding may be broken up by hand or subjected to a screening operation, but the operation is materially facilitated by combining it with a mechanical regrinding operation, and particularly by a regrinding operation in a ball mill in the manner above described.

When a ball or pebble mill is used for the production of the catalyzer, in the first instance, and for the subsequent regrinding thereof, either with or without the presence of oil, this ball or pebble mill operation will, if the mill is rotated at a proper speed, subject the nickel to a combined rubbing, squeezing and percussive action well adapted to the production of the catalyzer and the development of the desired catalytic activity therein.

The amount of abrasive, when used, as well as the amount of water, in the production of the catalyzer, may vary considerably, and good results nevertheless be obtained. In general, the amount of water and abrasive should be so proportioned that an effective abrading or grinding operation will be secured. When small amounts of abrasive are used the action will partake of the action of nickel upon nickel, with the added abrasion incident to the small amount of abrasive present. When a larger amount of abrasive is used, the action will partake rather of a direct action of the abrasive upon the nickel, and this action will be promoted by the ball mill operation.

Where an abrasive is employed, the nickel catalyzer produced will be a composite product containing both the finely pulverulent nickel catalyzer and the finely divided abrasive. The abrasive may, however, be of such a different order of fineness from the minute catalyzer particles, that it may be in part separated therefrom as by differential sedimentation.

In general, the nickel catalyzer particles can be readily produced of such minuteness and exceeding fineness that they approach colloidal particles in their state of subdivision, and can be readily suspended in water or in oil, and will settle out slowly. A catalyzer of this character is well adapted for use for the catalytic hydrogenation of oils, after the catalyzer has been incorporated with the oil, and the water has been removed therefrom.

The finely divided abrasive, when present, facilitates the handling of the catalyzer and its subsequent removal from the oil to be hydrogenated, particularly when, as will usually be the case, the finely divided abrasive particles are present in considerable amount and are of larger size and less specific gravity than the catalyzer particles themselves.

Instead of nickel, other catalyzers may be similarly produced in accordance with the process of the present invention; but I have found the invention of particular value in connection with the production of finely pulverulent nickel catalyzers of a fineness enabling them to be readily maintained in suspension in the fatty oils to be hydrogenated therewith.

With such other catalyzer materials or metals, as well as with nickel, the abrasive employed should be of such a character that it is not prejudicial to the catalytic activity of the resulting product, and preferably it should be of a character such that it will facilitate and promote the desired catalytic properties and activity.

Having thus described my invention, what I claim is:

1. The method of producing a catalyzer, which comprises subjecting substantially non-catalytic bulk nickel to attrition or abrasion, in the presence of water, and thereby producing therefrom a finely pulverulent nickel catalyzer of high catalytic activity.

2. The method of producing a finely pulverulent nickel catalyzer in suspension in water, which comprises converting bulk nickel, by mechanical means, into a finely pulverulent state in the presence of water, thereby producing an aqueous mud containing the finely pulverulent nickel therein.

3. The method of producing a catalyzer, which comprises abrading substantially non-catalytic metal, in the presence of water, and thereby producing a finely pulverulent catalyzer in the presence of water.

4. The method of producing a catalyzer, which comprises subjecting substantially non-catalytic bulk metal to attrition or abrasion in the presence of water and thereby producing therefrom a finely pulverulent abraded metal catalyzer of high catalytic activity.

5. The method of producing a catalyzer, which comprises abrading a catalyzer metal with the aid of a finely divided abrasive and water, and thereby producing a finely pulverulent catalyzer of high catalytic activity in admixture with the abrasive and water.

6. The process of forming a catalyzer by abrading a catalyzer metal in the presence of water.

7. The method of producing a catalyzer, which comprises abrading the catalyzer metal in the presence of water and thereby producing a finely pulverulent catalyzer admixed with water, removing the water, and subjecting the catalyzer to a further grinding operation.

8. The method of producing a nickel catalyzer, which comprises subjecting bulk nickel to abrasion, in the presence of water, and thereby producing a finely divided product in the form of an aqueous mud, removing the water therefrom, and re-grinding the resulting product.

9. The method of producing a nickel catalyzer, which comprises abrading bulk nickel in the presence of a finely-divided abrasive and water, and thereby producing a finely-divided product in the form of a mud containing the nickel and abrasive, removing the water therefrom, and re-grinding the dried product.

10. The method of producing a nickel catalyzer, which comprises abrading bulk nickel in the presence of water to produce a finely pulverulent nickel catalyzer admixed with water, removing the water therefrom, and regrinding the resulting product with oil.

11. The method of producing a nickel catalyzer in oil, which comprises converting substantially non-catalytic bulk nickel, by mechanical means, in the presence of water, into a finely pulverulent nickel catalyzer with particles of such exceeding fineness as to be readily maintained in suspension in water, removing the water from the resulting pulverulent product and incorporating the same with oil to form a finely pulverulent catalyzer therein.

12. The method of producing a nickel catalyzer, which comprises subjecting a mixture of nickel and an abrasive to an abrading operation in the presence of water and thereby producing a composite product containing the abrasive and the finely pulverulent nickel catalyzer admixed with water, removing the water therefrom and incorporating the same with oil to form a finely pulverulent catalyzer therein.

13. The method of producing a catalyzer, which comprises subjecting catalyzer metal to a ball mill operation in admixture with a finely-divided abrasive and water, and thereby producing a finely pulverulent catalyzer in admixture with the abrasive and water, removing the water therefrom, and incorporating the resulting product with oil by a further ball mill operation.

14. The method of producing a nickel catalyzer, which comprises converting bulk nickel, by mechanical means, and in the presence of water, into a finely pulverulent nickel catalyzer with particles of such exceeding fineness as to be readily maintained in suspension in the water, removing the water and subjecting the finely pulverulent catalyzer to a ball mill operation in the presence of oil for incorporating the finely pulverulent catalyzer with the oil.

15. The method of producing a nickel catalyzer, which comprises subjecting bulk nickel to a ball mill operation in admixture with a finely-divided abrasive and water, and thereby producing a nickel catalyzer in the form of an aqueous mud containing the finely pulverulent nickel and abrasive, removing the water therefrom, and subjecting the dry product to a further ball mill operation in the presence of oil in order to incorporate the oil therewith.

In testimony whereof I affix my signature.

WILLIAM D. RICHARDSON.